Figure 1:
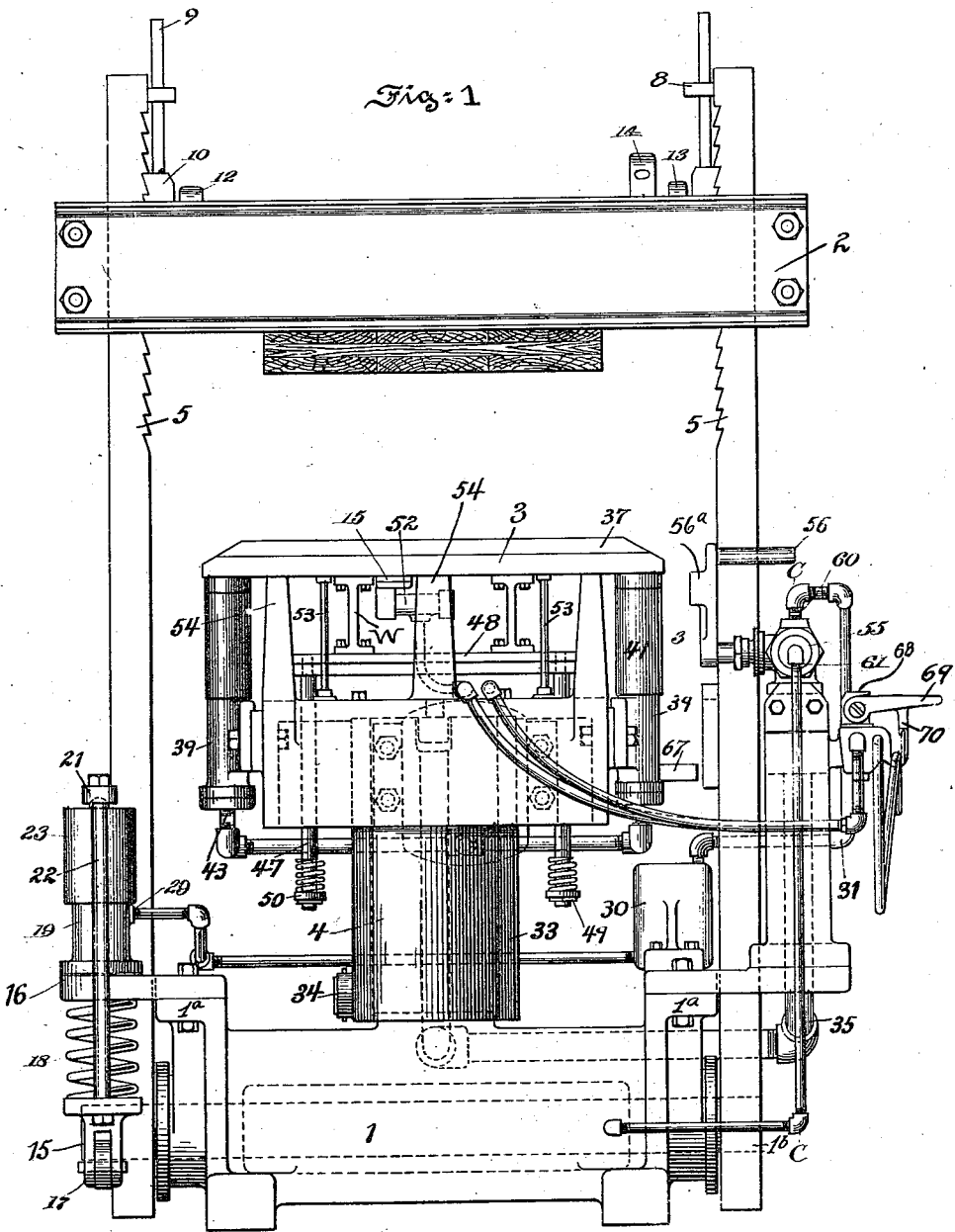

W. LEWIS.
MOLDING MACHINE.
APPLICATION FILED SEPT. 21, 1901.

961,702.

Patented June 14, 1910.
8 SHEETS—SHEET 1.

W. LEWIS.
MOLDING MACHINE.
APPLICATION FILED SEPT. 21, 1901.

961,702.

Patented June 14, 1910.
8 SHEETS—SHEET 2.

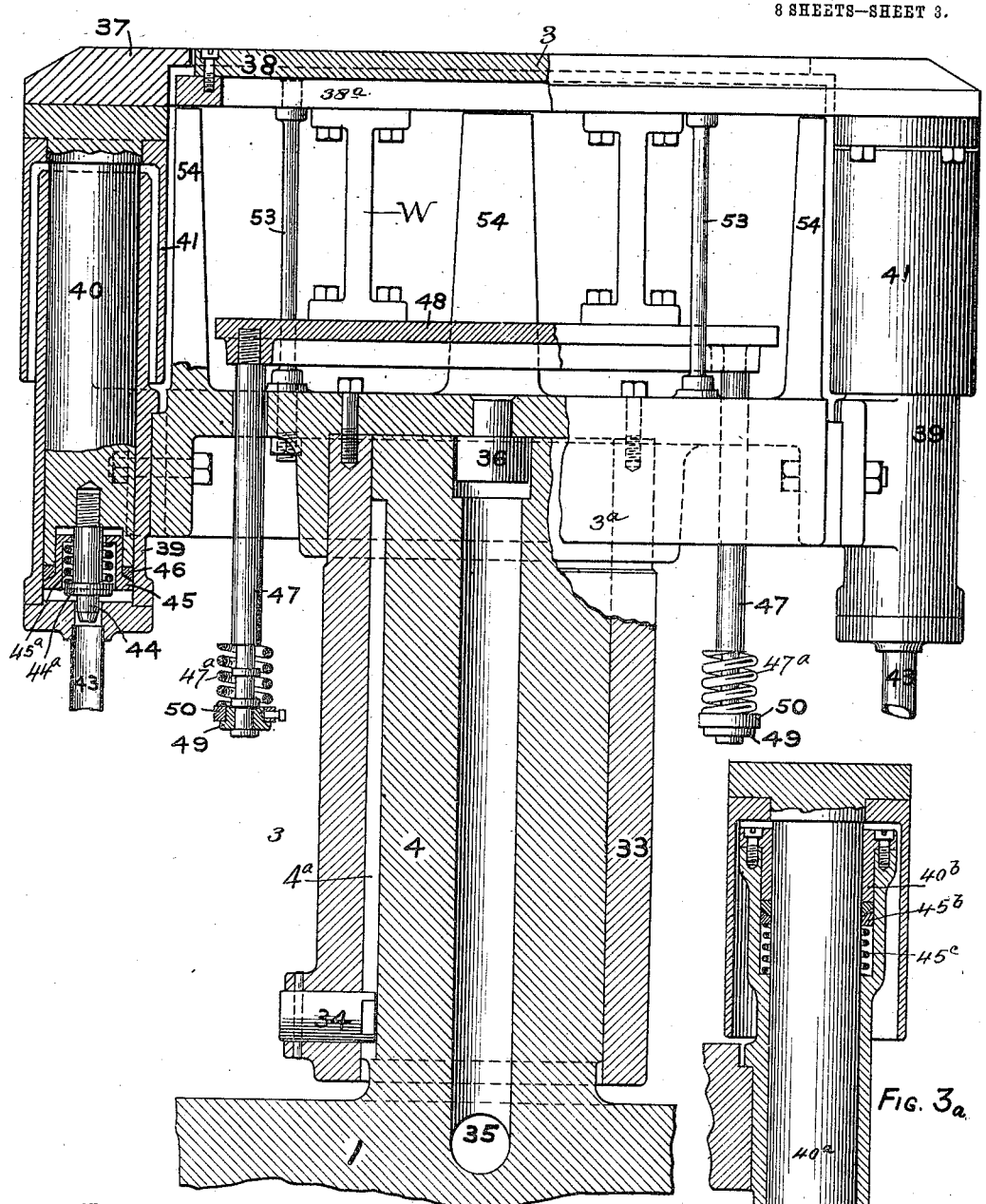

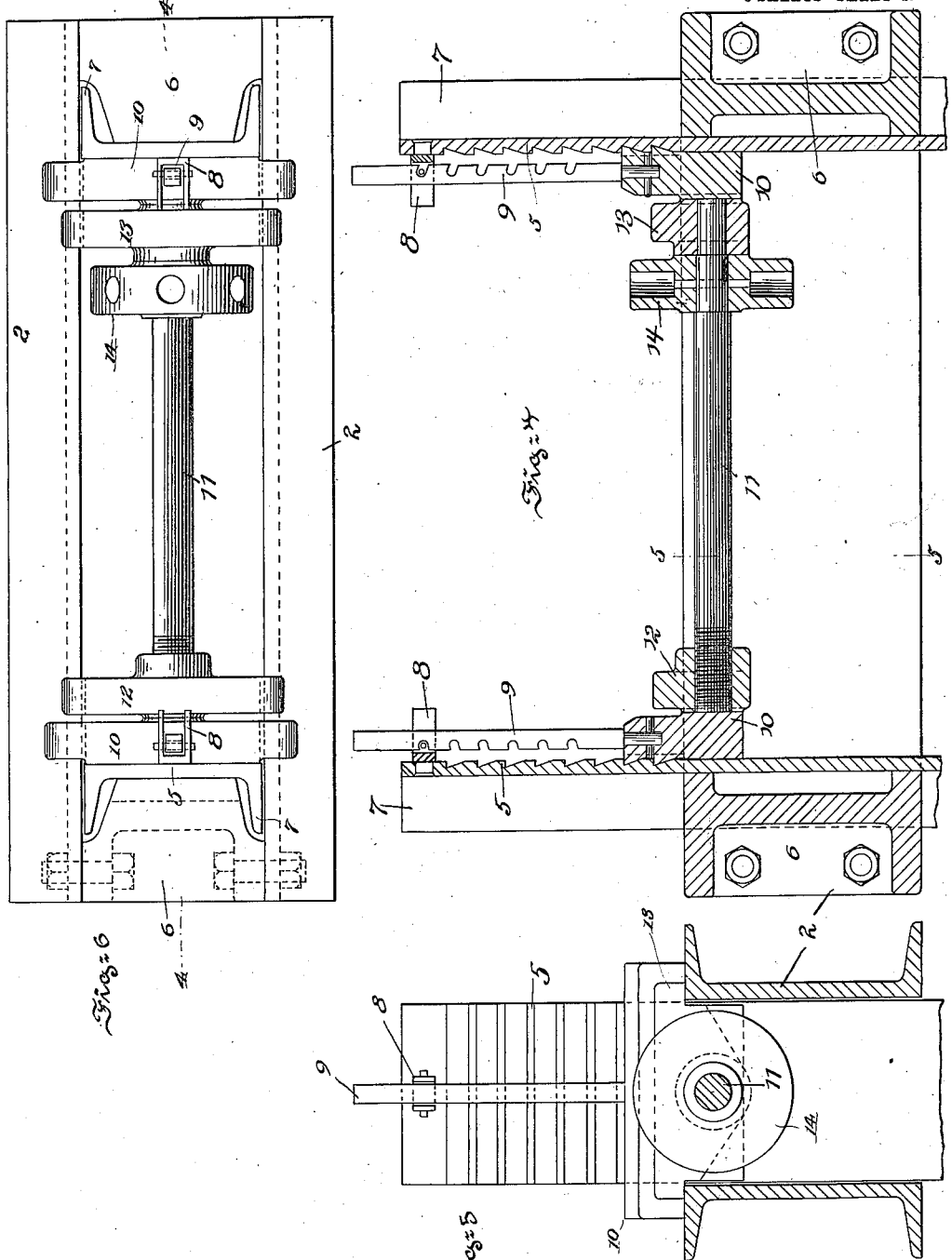

W. LEWIS.
MOLDING MACHINE.
APPLICATION FILED SEPT. 21, 1901.
961,702.
Patented June 14, 1910.
8 SHEETS—SHEET 5.
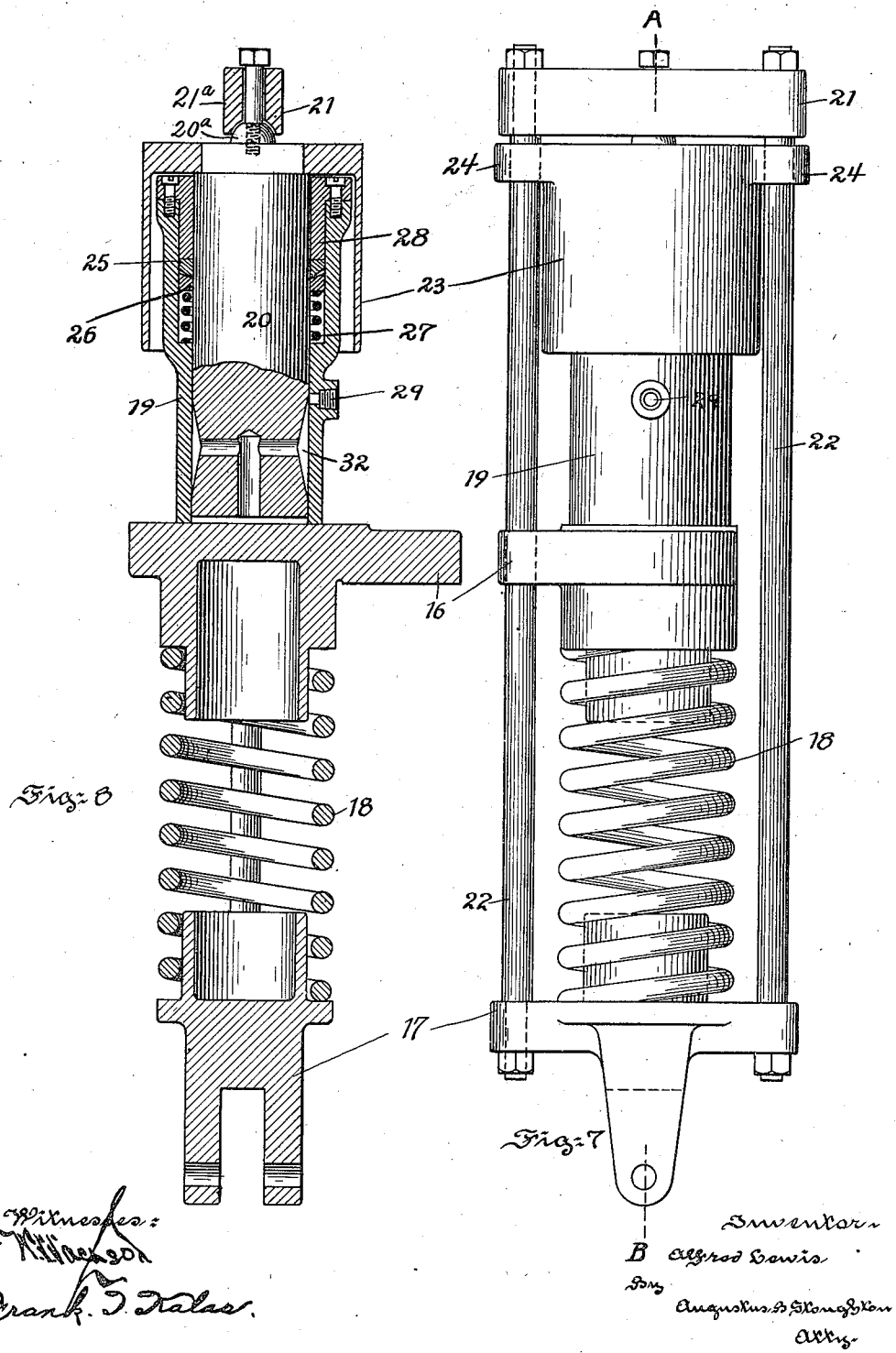

W. LEWIS.
MOLDING MACHINE.
APPLICATION FILED SEPT. 21, 1901.
961,702.
Patented June 14, 1910.
8 SHEETS—SHEET 6.
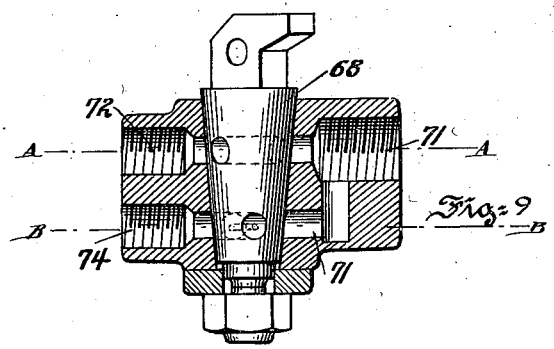
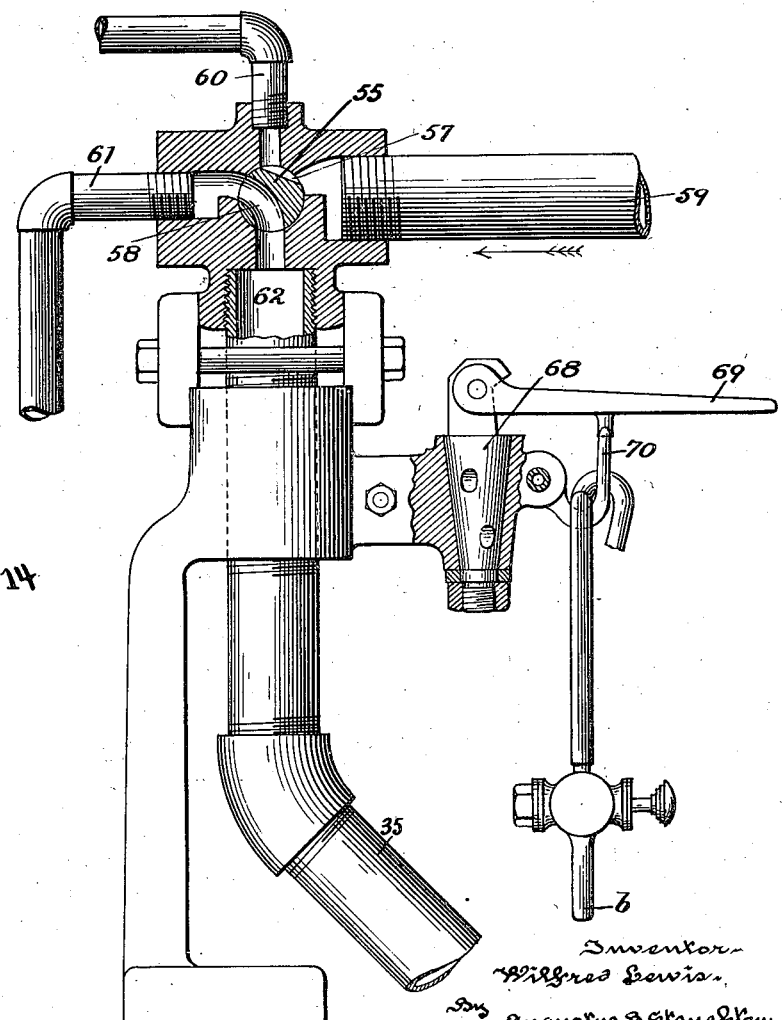

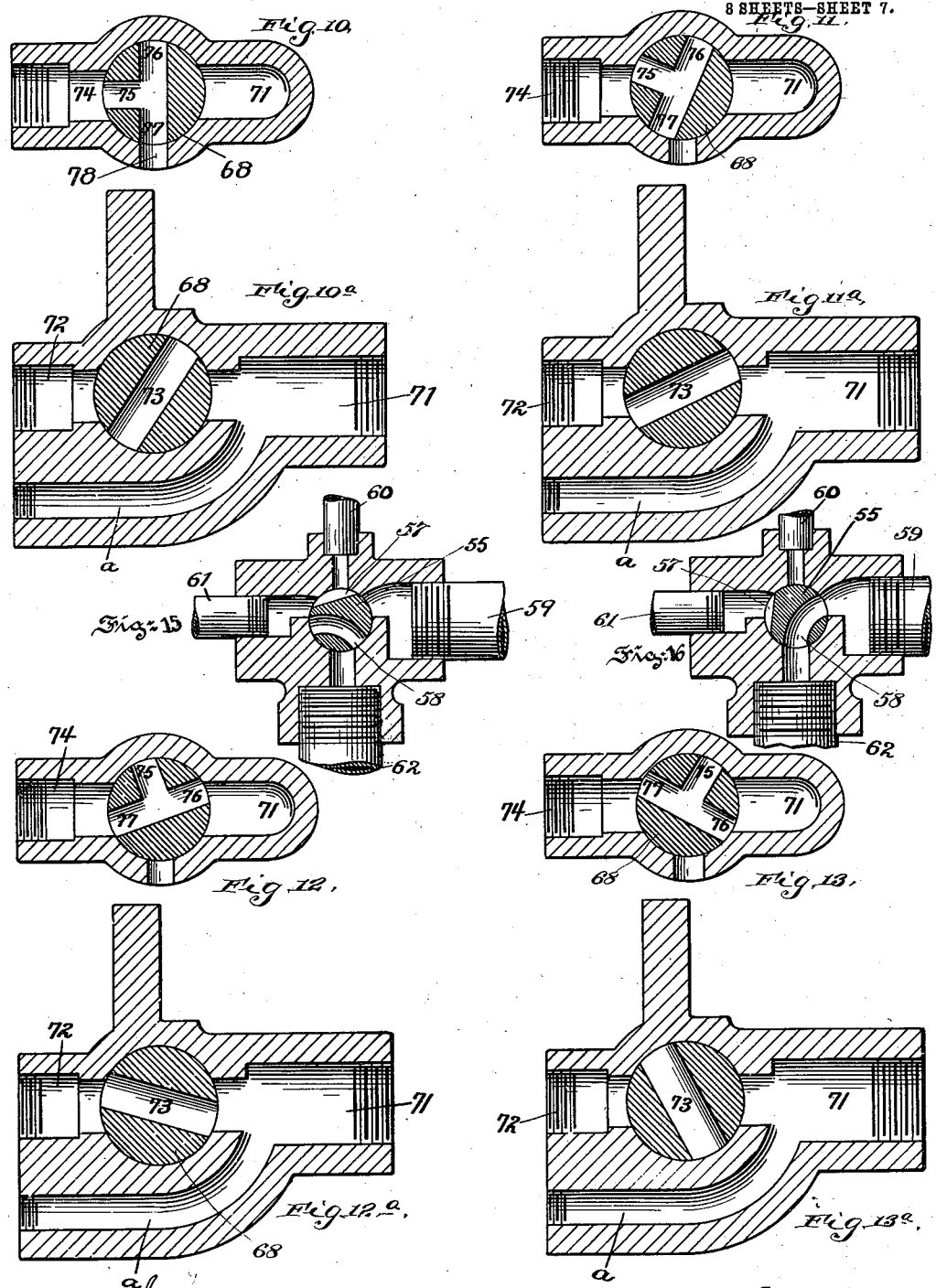

W. LEWIS.
MOLDING MACHINE.
APPLICATION FILED SEPT. 21, 1901.
961,702.
Patented June 14, 1910.
8 SHEETS—SHEET 8.
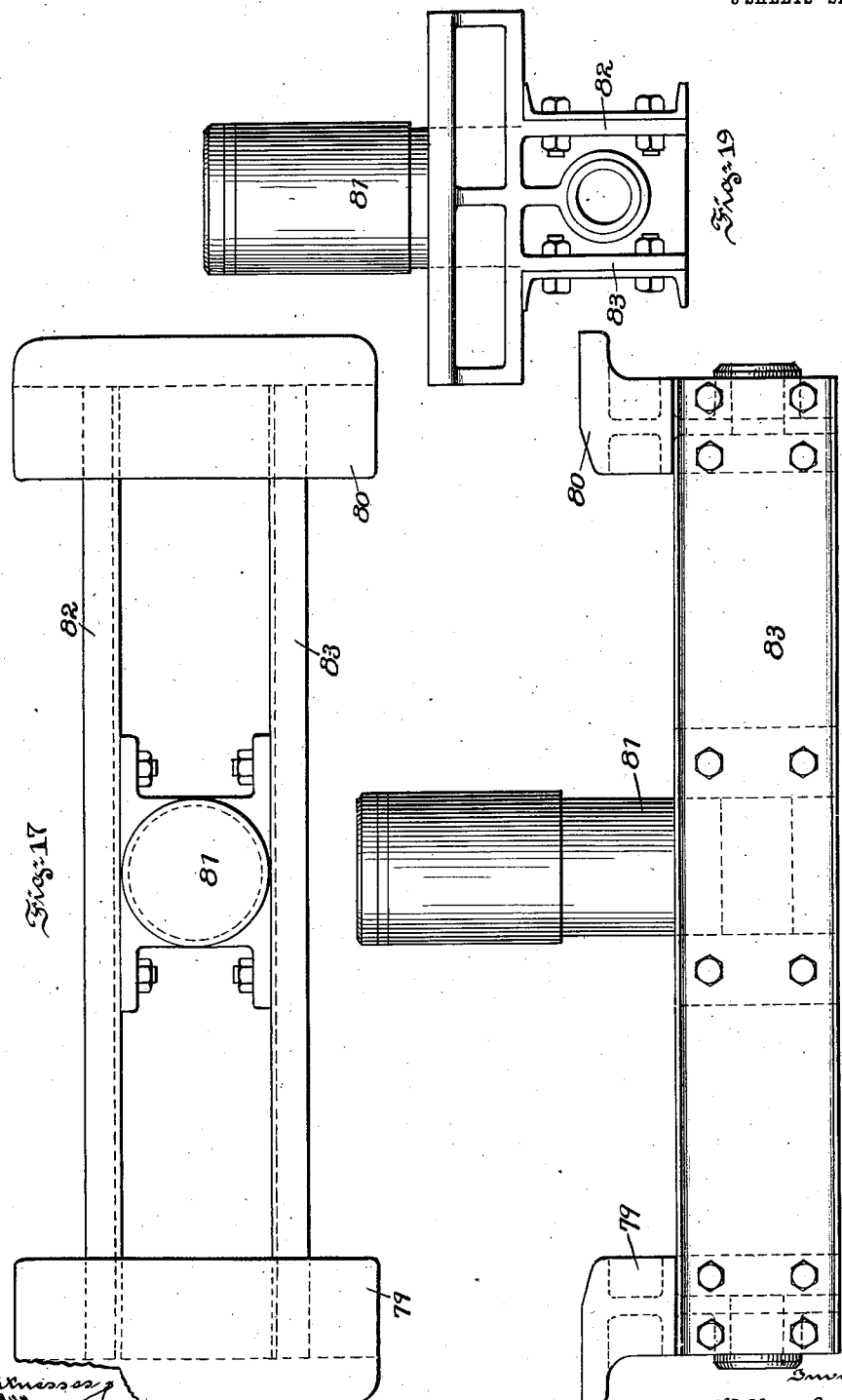

UNITED STATES PATENT OFFICE.

WILFRED LEWIS, OF PHILADELPHIA, PENNSYLVANIA, ASSIGNOR TO THE TABOR MANUFACTURING COMPANY, OF PHILADELPHIA, PENNSYLVANIA, A CORPORATION OF NEW JERSEY.

MOLDING-MACHINE.

961,702.　　　　　　　Specification of Letters Patent.　　Patented June 14, 1910.

Application filed September 21, 1901. Serial No. 76,046.

*To all whom it may concern:*

Be it known that I, WILFRED LEWIS, a citizen of the United States, residing at Philadelphia, in the county of Philadelphia and State of Pennsylvania, have invented certain new and useful Improvements in Molding-Machines, of which the following is a specification.

The invention relates to molding machines in general, and more particularly to vibrator molding machines, in which power is used to free the pattern from the sand while being drawn. To effect the latter purpose, various devices have hitherto been employed, the most successful of which consists in a pneumatic hammer attached to the pattern plate. To permit vibrations the pattern plate has been allowed to rest loosely on fixed supports to which it has been elastically secured by centering pins surrounded by rubber bushings. When the pneumatic hammer is in action, the pattern plate slides on its supports, through the amplitude of the vibration, and wear results, which in time causes displacement of the pattern plate. Furthermore, the rubber bushings deteriorate in time, lose their elasticity and fail to center the pattern plate as well as they did at first. These defects apply to all vibrator molding machines as hitherto constructed, but molding machines in general are also defective in the methods hitherto employed for drawing patterns.

To obtain the best results, it is necessary that the pattern or flask, whichever moves in the act of drawing, shall be guided with great care and accuracy. This has been done most successfully by long guide pins moving in accurately fitted sockets, and when the machine is new, good results are obtained. It has been difficult, however, to prevent wear in the moving parts, which, on account of their vertical position, carry off any lubricant that may be applied. In time, therefore, the guides become worn and inadequate, and hitherto no remedy for this defect has been devised.

It is also a matter of importance in drawing patterns, that the movement should begin slowly, and when this is left to the judgment of inexperienced workmen the mold may be destroyed. Hitherto no device for automatically controlling the speed of lift to permit of a safely accelerated motion has been applied to a molding machine, nor has the desideratum of checking the return movement without shock been satisfactorily achieved.

In machines which ram by power, still further defects in construction and operation remain to be noted. When the actuating power is steam or air, the ramming head moves quickly and a sharp blow is frequently struck against the opposing head or yoke. This does no harm when a flask with compressible sand intervenes, but if through carelessness this natural buffer is wanting, the machine becomes self-destructive. Limit stops have been provided, but no solid abutment can withstand the shock and hitherto no satisfactory safeguard has appeared. So, also, when the ramming head returns to its original position, the shock of impact in stopping has caused the introduction of buffer springs to catch the falling weight and soften the blow. These springs are in time pounded down and destroyed and the problem of checking the drop of the head with precision and yet without shock has hitherto remained unsolved. The most common form of yoke or swinging head is carried on a shaft in the foundation base of the machine, and the weight of the head as it swings is preferably counterbalanced by springs at the ends of cranks. These springs are adjusted to let the head remain back or hold it against stops in working position, and the movement of the head is generally performed by hand. This is an easy matter on small machines and within certain limits no power is needed, but occasionally machine users have improvised means for swinging the head by power. Here, again, however, the difficulty has been to move quickly and stop without shock or injury to the machine. Wooden blocks have been used for the head to strike against at full speed, but hitherto no mechanism has been devised to move quickly and stop softly in both extreme positions of the swinging head, nor has the movement of this head been made to follow automatically, as a natural sequence to that of ramming without special attention on the part of the operator.

Further difficulties have arisen from the construction of the swinging head, which has hitherto been carried on bolts having but little lateral strength to resist an eccentric load, and the parallelism of this head with the flask frame has been made to depend upon the care exercised in setting it. The swinging head itself has hitherto been a casting requiring a different pattern for every different length and the base of the machine has also been exclusively a casting on which pattern work must be spent for every change in length.

In the matter of pattern-drawing on vibratory machines, it has hitherto been necessary to manipulate a starting valve for the vibrator and a lever for drawing by hand, or another valve for drawing by power, and the possibility of performing both operations in proper sequence by the movement of one valve lever has not hitherto been realized.

Objects of the present invention are first to obviate the above-mentioned defects and disadvantageous features, and to improve, simplify and cheapen both the construction and operation of the machine; second, to simplify and improve the construction of the swinging head or yoke, whereby it may be constructed to suit machines of various sizes with a minimum of pattern work, and to insure easy adjustability and proper parallelism of that part of it which receives the impact of the sand; third, to provide for shifting the swinging head or yoke into and out of operative position by power and without shocks or jars; fourth, to provide a construction for the base of the machine which shall be strong and capable of being produced in sizes adapted to various types of machines with a minimum of pattern work for castings; fifth, to provide efficient and durable means for supporting the part to which the vibrator is applied in such a way that it remains, even after considerable use, free to vibrate, while at the same time it is capable of taking up whatever stress or strain is brought to bear upon it without being accidentally shifted from its correct and proper position; sixth, to provide efficient, reliable and self-lubricating means for moving the part which it is necessary to move in order to draw the pattern, whereby proper alinement of this part throughout its movements is maintained and insured; seventh, to provide an adjustable stop for limiting the travel of that part which is moved in order to draw the pattern; eighth, to provide interlocking valve gear, whereby the operator is constrained to cause the machine to effect the steps in its complete operation in their proper sequence and relation to each other; and ninth, to provide self-packing means for the various cylinders or plungers.

To these and other ends hereinafter set forth, the invention comprises the improvements hereinafter described and claimed.

The nature, characteristic features and scope of the invention will be more fully understood from the following description taken in connection with the accompanying drawings, forming part hereof and in which—

Figure 2:
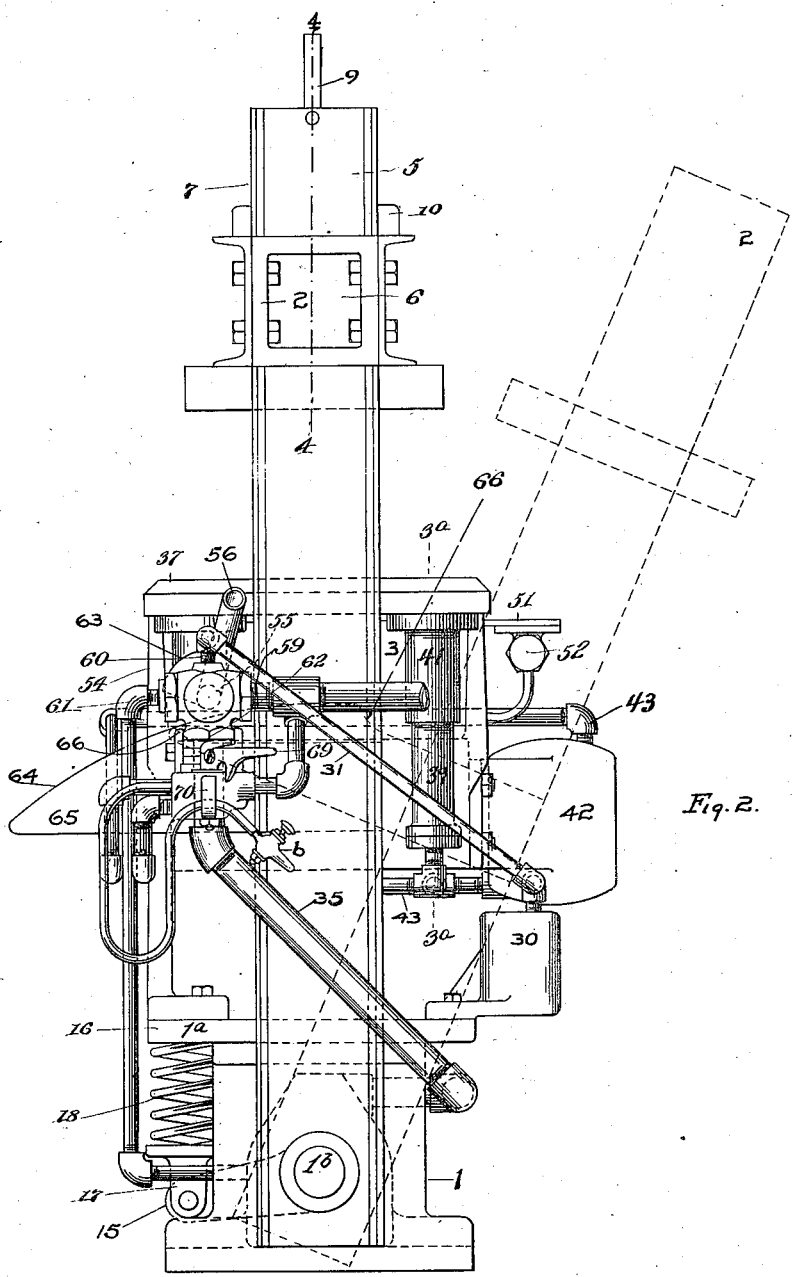

Figure 1 is a front view illustrating, in elevation, a molding machine embodying features of the invention. Fig. 2 is an end view of the same. Fig. 3 is a detached view, drawn to an enlarged scale and illustrating, principally in sections through the various cylinders, details of construction of the ramming head and its accessories. Fig. 3ª is a view of a detail of construction and is a section on the line 3ª—3ª, of Fig. 2. Figs. 4, 5 and 6 are respectively a sectional elevation, an end elevation and a plan of the upper portion of the swinging head or yoke, and Fig. 4, is taken on the line 4—4, of Figs. 2 and 6, and Fig. 5, is taken on the line 5—5, of Fig. 4. Fig. 7 is a full view drawn to an enlarged scale and illustrating means embodying features of the invention for swinging the head or yoke. Fig. 8 is a sectional view on the line A B of the apparatus shown in Fig. 7. Fig. 9 is a view, principally in sections illustrating the valve for the vibrator and for the drawing cylinder. Figs. 10, 11, 12 and 13, are sections on the line B—B, of Fig. 9, and Figs. 10ª, 11ª, 12ª and 13ª, are sections on the line A—A, of Fig. 9, and these views illustrate the various positions of the valve shown in Fig. 9. Fig. 14 is a view illustrating the valve gear for controlling the operation of the machine. It is an enlarged view partly in section on the line C—C, of Fig. 1. Figs. 15 and 16 are views showing different positions of the valve shown at the upper part of Fig. 14; and they are sections taken on the line C—C, of Fig. 1; and Figs. 17, 18 and 19 are respectively a plan, a side, and an end view of a bed embodying a modification of the invention.

In the drawings, 1 is the base. 2 is a swinging head pivotally connected with the base and arranged to occupy the position shown in full lines on Fig. 2 to receive the thrust of the same when it is rammed, and to occupy the position indicated in dotted lines on said figure so as to permit of the introduction of sand and of the removal of the flask. 3 is the ramming head, which carries the pattern and flask and which is capable of movement as a whole in respect to the swinging head to ram the sand, and which is also capable of movement in detail between the cylinder head 3ª, Figs. 1 and 3, on which the pattern 38, is mounted and the flask frame 37, on which the flask is carried so as to draw the pattern or patterns. Speaking generally, these are parts of well-known molding machines to which, as well as to other types of molding machines, the improvements which constitute the present invention are in whole or in part applicable.

As shown in Figs. 1 and 2, the base of the machine comprises a casting provided with bearings for the swinging frame 2, and with brackets 1ª to which various parts of the machine are connected, as shown, and with one of the parts of the piston and plunger, by means of which the ramming head is operated. As shown, the base 1 is provided with the plunger 4, Fig. 3, on which the cylinder is made to slide, but frequently the arrangement is reversed, making the cylinder a part of or attached to the base and a plunger movable thereon to ram the sand, and in general it will be understood that plungers and cylinders are mutually interchangeable for whatever purposes they may be employed on these machines. The swinging head or yoke 2 is shown to consist of two channel irons fitted near their upper ends with teeth 5, and the yoke itself also consists of two channel irons held apart by suitable distance pieces 6, to which they are bolted.

At the upper end of the channels 7 the supports 8 are attached from which are suspended by the notched rods 9 the stops or detents 10, which are made to engage the teeth 5 in the channels 7. The notches in the rods 9 correspond in pitch with the teeth 5, so that the stops 10 will always be in position to engage the teeth 5 when suspended at any height by the rods 9.

11 is a binding screw resting at one end in the nut 12 and at the other end in the abutment bearing 13, both nut and bearing being supported and free to slide on the horizontal channels forming the adjustable head or yoke. The parts 12 and 13, are held from turning by the channel beams upon and between which they rest and which are shown in Fig. 6.

14 is a capstan head secured to the binding screw 11. When the yoke 2 is raised against the stops 10 by the action of the ramming head or pattern drawing cylinders through the intervention of suitable packing, the nut 12 and the abutment bearing 13 can be forced against the stops 10 by a hand lever inserted in the capstan 14 with sufficient force to clamp the yoke on its standards 7 and support its weight by friction when the lifting force is withdrawn. This arrangement for adjusting the head and securing it in position permits the stops to be adjusted in advance for any height of head desired, and thus facilitates the operation of moving the yoke, while at the same time it secures it firmly to the standards and thereby materially increases the lateral stiffness of the swinging head as a whole. Other devices may be and have been employed to secure this result, all of which are in the nature of detail which might suggest itself to a skilful mechanic, but the arrangement here shown and described is advantageous for its simplicity and convenience.

The described arrangement affords convenient means for adjusting the yoke in respect to its standards and at the same time insures parallelism of movement of the yoke. Extending from the shaft 1ᵇ, by means of which the yoke is pivoted to the base, are one or more arms 15, by means of which the yoke is swung from one of its positions to the other. Interposed between the arm 15 and a bracket 16, on the frame, is the mechanism for shifting or swinging the yoke, and it is illustrated in Figs. 7 and 8. This mechanism comprises, as there illustrated, a complete device having its parts connected one with the other. The arm 15 is connected with the coupling 17, and interposed between the coupling 17, and the bracket 16 is a helical spring 18, which is possessed of sufficient strength to and which tends to swing the frame 2 into upright position, as shown by the full lines in Fig. 2. To cause the yoke 2 to swing back into the position indicated by dotted lines in Fig. 2, it is necessary to overcome the spring 18. For this purpose use is made of a cylinder 19 and plunger 20. The cylinder is fixed to the bracket 16, and the plunger is connected with the coupling 17, by way of the plate 21 and tie rods 22. As shown, the plunger has a ball-and-cup connection 20ª and 21ª with the plate 21, to permit of a slight lateral movement in the coupling 17 as it swings on the arm 15. The plunger is also provided with a skirt or dust guard 23, which has wings 24 that work loose on the tie rods 22. When the plunger 20 is forced, in a manner to be described, out of its cylinder, it is apparent that the coupling 17 is drawn upward, overcoming the spring 18 and lifting the arm 15 upward so that the yoke 2 is turned backward into the position shown by dotted lines in Fig. 2. When the plunger 20 is permitted, as will be described, to reënter its cylinder, the spring 18 will expand, thus turning the arm 15 downward and swinging the frame 2 into the position indicated in Fig. 2 in full lines. The plunger 20 Fig. 8 may be packed on the end, if economy of space is an object, in the manner shown at 45, 46, 45ª and 44ª, in Fig. 3, and hereinafter described, but where room is abundant, it is preferably packed as shown by a gasket with spring follower fixed in the cylinder; 25 is a gasket preferably of leather; resting on the follower 26 and 27 is a compression spring; 28 is a gland inserted above the gasket 25 and secured in the cylinder 19. The gasket 25 is beveled so that a corresponding bevel on the follower 26 will cause it, under the spring pressure, to hug the plunger 20, and since the force of the spring is limited by its stiffness and the compression allowed the friction of the packing may not exceed a certain desired limit which is essential to the successful operation of the device for swinging the head as well as for drawing the patterns. An operating fluid, preferably oil, is admitted and discharged from the cylinder 19 through the orifice 29, leading to a tank in which pressure is applied or withdrawn by an acting fluid as air, and the same combination of air and oil is also used to effect the operation of the pattern drawing cylinders. The supply of oil for operating the plunger 20 may be conveniently kept in a reservoir 30 and supplied, for example, by means of a pipe 31. It will, of course, be understood that the oil is forced by the air into the cylinder and is exhausted from the cylinder upon the removal of the air pressure, the spring 18, as well as the weight of the parts, serving to create the pressure for the exhaust It is desirable in actuating the plunger 20, to have it start and stop slowly in respect to its lowest position, and a description with reference to Fig. 8 will now be given of means for accomplishing this result. The fluid entering through the orifice 29 is restricted in its passage to the end of the plunger by the space into which it flows around the plunger. This is shown as an annular double cone or double bevel 32 turned on the end of the plunger, but, of course, it might be simply a groove on one side, the annular form being adopted to avoid the necessity for locating a groove opposite to the orifice 29. At either end of the stroke, the area of the stream of flow is very small, causing slow movement in the swinging head, while in the middle it is large, permitting rapid motion, and in either direction the head is caused to start and stop slowly with a quick intermediate movement.

A description will now be given of the means for raising and lowering the ramming head with a slow motion at the beginning of its upward stroke and at the end of its downward stroke, and in this connection reference will be made more particularly to Fig. 3. The cylinder 33 is secured to and depends from the ramming head and between the cylinder 33 and the plunger 4, which is attached to the base 1, there is a key or feather 34, and its complemental way 4ª for preventing accidental rotation of the ramming head. Through the plunger extends an opening that communicates with a pipe 35, by means of which air is conveyed to the interior of the cylinder 33. The ramming head is provided upon its under face with a projection or plug 36, which extends into but does not tightly fit the opening through the plunger or piston. When air enters the opening 35, it in order to reach the interior of the cylinder must leak around the plug 36. In doing so its admission is comparatively restricted, so that the cylinder and the ramming head start to rise slowly, giving time for the operator to turn the air cock 55, Fig. 14 wide open before much distance has been traversed, but when the projection 36 has escaped from the opening the ingress of air is comparatively unrestricted, so that the movement of the ramming head is rapid. Upon the return or downward stroke of the ramming head the opening 35 is serving as an exhaust passage. The projection or plug 36 upon entering it restricts it, and traps some of the air in the cylinder, and this air in escaping must leak around the projection or plug, so that it escapes slowly. The result of this is that the ramming head completes its downward stroke slowly, and this is desirable because it not only saves the machine from shocks and jars, but also prevents undue shaking of the sand in the mold. To provide against damage which might occur if the same were absent, the upward movement of the ramming head is checked by disconnecting the conveyer 35 from the supply of compressed air and connecting it with an exhaust. The way in which this is accomplished will be described hereafter in connection with the valve gear.

In the machine shown in the drawings the flask support 37 is lifted in respect to the pattern plate 38 and to the ramming head, as a whole in order to draw the patterns. For this purpose cylinders 39 are bolted or otherwise secured to the cylinder head 3ª, and plungers 40 depend from the flask support and work in the cylinders. The flask support is also provided with skirts 41 that depend around the cylinders 39 and constitute sand guards. The tank 42, Fig. 2, serves to supply oil by way of the connections 43 for working the plungers or pistons 40. The pistons 40 are provided with projections 44 which take into and out of the opening 43 in the same way as the projection 36 operates in respect to the opening 35. Thus these projections 44 serve to cause the pistons 40 to start slowly in their rising motion and to stop slowly in their falling motion. This is important because if they were to rise too quickly the result would be that the pattern was withdrawn quickly from the sand and that would tend to destroy the mold. These pistons 40 are packed, as shown in Fig. 3, by counter-boring their lower ends and fitting into them thimbles 45 which have flanges to engage a packing 46, and also a spring 45ª that is seated upon a collar 44ª on the projection 44. This packing is similar to the one described in connection with Fig. 7, and is automatic in its action in the sense that its spring 45ª pushes upon the thimble 45, and the latter squeezes the packing 46 and causes it to properly hug the internal wall of the cylinder. This form of packing requires a cylinder of less outside diameter than that shown in Fig. 8, and for this reason it is sometimes preferred, but the alternate form of guide cylinder shown in Fig. 3ᵃ is also employed for the well known facility with which an external cylinder surface can be perfected and where room permits this form is generally used. In Fig. 3ᵃ, the projection 44, is formed directly on the plunger 40ᵃ, a ring 45ᵇ, takes the place of the thimble 45, Fig. 3, and a spring 45ᶜ, performs the function of 45ᵃ, Fig. 3. The gland 40ᵇ, Fig. 3ᵃ, is attached to the casing 39, and holds the packing in place. In either case, however, the action is the same and both cylinders are thoroughly lubricated by oil used in operating.

In Fig. 3 a small amount of oil goes by the packing at every stroke of the plunger, and in Fig. 3ᵃ the plunger is simply immersed for a greater depth below its packing. The lubrication in both cases is perfect and this constitutes an important feature of my invention, because it prevents wear and insures a continuance of perfect alinement in the pattern draft. The cylinders 39, and the plungers 40, are each rigidly connected respectively with the part 3ᵃ, and the flask support 37. Thus they serve not only to lift but also to guide. It is desirable to provide means for checking the upward range of travel of flask frame 37, and such means should have provisions whereby a range of adjustment is afforded. To this end a stop-rod 47 is provided. This stop-rod works in an opening in the ramming head and is connected with the flask frame 37 in a manner to be next described. As shown, this result is accomplished by securing it to a stool-plate 48 which latter is in turn connected by means of brackets or hangers W with the flask frame. At its lower end the rod 47 carries a spring 47ᵃ which serves as a buffer in checking the rise of the flask support. The lower end of the rod 47, in order to provide an adjustment, is turned down so as to provide several seats. Into one of these seats is fitted an axially split ring 49, Fig. 3, over which is fitted or dropped a continuous ring 50 against which the spring 47ᵃ is seated. By lifting the continuous ring 50 it is possible to pull the halves of the ring 49 apart and fit it into another seat on the rod 47, whereupon the continuous ring 50 is dropped over the halves and serves to retain them to place.

The object of using a notched rod with adjustable collars instead of nuts to screw up and down is to insure the parallelism of two similar stops which are generally required. Where one only is possible an ordinary nut could be used, and even with two rods nuts can be used if care is taken to adjust them on both rods alike.

The stool plate 48 is merely mentioned as a convenient means for connecting the rods 47 with the flask frame. Its purpose is well understood and is to support stools which extend up through the pattern plate and support the sand in difficult portions of the mold.

There is illustrated in Fig. 1 a vibrator 52 connected with the pattern plate 38. The vibrator 52, is connected with the pattern plate 38, by means of a plate 51, Fig. 2, attached to the frame 38ᵃ, Fig. 3, on which the pattern plate is secured. The frame 38ᵃ, is supported by the flexible columns 53, and serves as a fixture to which different pattern plates may be attached. The vibrator as well as its function is well understood and needs no further description than to say that the vibrator is operated by air and serves to shake the pattern plate and patterns as the latter are being drawn from the sand. To permit of the proper vibration the pattern plate is connected with the ramming head by means of flexible columns or slender struts 53 as of steel. These columns 53 have rigid connection with the ramming head and with the pattern plate, and it is their own elasticity or flexibility which permits the pattern plate to vibrate. This is a very important construction because since it is merely the spring of the columns which allows the vibration, it follows that there is no wear, and that the proper positioning of the pattern plate is insured. The abutments 54 on the ramming head are a trifle shorter than the columns 53, and when pressure is brought to bear upon the pattern plate, as in ramming, it will spring or yield and the abutments 54 take part of the stress or strain. Before describing the valve gear by which the various cylinders or pistons or plungers are controlled, it may be well to state that there are only two valves, of which one when operated serves to swing the ramming yoke 2 into upright position, and upon and not before the completion of this operation to lift the ramming head and let it descend. The other serves to set the vibrator in motion, and to then and not until then lift the flask and draw the pattern which is the complete cycle of operations.

The plug valve 55, Figs. 14, 15, 16, controls the swinging yoke and ramming head, and it is fitted with a handle 56, Fig. 2, and with two ports or passages 57 and 58. The casing for this valve 55 is provided with an air inlet 59 for compressed air, and with an outlet 60 to the oil tank 30, and with an outlet 61 to the exhaust, and with an outlet 62 to the pipe 35 of the ramming head. The position of the valve shown in Fig. 14 is what may be termed the first position, and is the position which it occupies when the swinging head is back, as shown in Fig. 2 in dotted lines, and the ramming head is down. It will be noted that in Fig. 14 the pipe 35 of the ramming cylinder communicates by way of the port 58, with the exhaust 61, so that the ramming head is necessarily down. It will also be noted that the supply of compressed air 59, is in communication by way of the part 57, with the pipe 60, that leads to the oil tank 30, so that the oil in that tank is under pressure and part of it reaches the cylinder 19, and overcomes the spring 18, and in that way permits the swinging yoke 2, to be in the position shown by dotted lines in Fig. 2, as has been hereinbefore described. When the plug valve handle 56, is turned in a counter-clockwise direction from the position shown in Fig. 2, it is interrupted at the position of the plug valve 55, shown in Fig. 15, by the segment 63, which it carries coming into contact with the circular portion 64, of an arm 65, attached to the swing frame. In that position the part 57 establishes communication between the parts 60 and 61, and thus relieves the air pressure in the tank 30. The result of this is that the spring 18, Fig. 7, pulls the swinging head into upright position. It may be remarked that sand can be introduced into the mold prior to bringing the swinging head into vertical position in the manner described. As the swinging head reaches its vertical position, it of course moves the arm 65, and when it reaches the vertical position a recessed portion 66, of it, comes opposite the segment 63, so that the handle 56 can be further turned in a counter-clockwise direction. The result of turning the handle 56 is to bring the plug 55 into the position shown in Fig. 16. In the position shown in that figure, communication is established between the air supply 59 and the pipe 35, which communicates with a cylinder 33. The result of this is that the ramming head ascends in the manner described and effects the necessary ramming of the sand. By way of precaution and to prevent any accident that might occur if the sand were not present and the ramming head were permitted to collide with the yoke 2, the ramming head is provided with a trip 67, which collides with a suitable lip 56ª or like provision on the shank of the handle 56, and in that way turns the plug into position for connecting the pipe 35 with the exhaust 61, so that the ramming head descends. Ordinarily the ramming head may be lowered by manual manipulation of the handle 56.

A description will now be given of the valve and its accessories which control the vibrator and the drawing cylinders 39, which operate to lift and lower the flask support, and in this connection attention is called more particularly to Figs. 9 to 14, inclusive. The plug 68 is provided with a movable handle 69, which may be turned part way through its range of motion and is thereupon arrested by a stop 70. This motion of the handle serves to set the vibrator 52 in motion, and it insures the operation of the vibrator before the pattern can be drawn, because as the handle 69 is turned, as described, the operator can plainly hear the vibrator, and if he does not he can take the proper steps to set it in motion, as for example, he may tap it lightly. The handle 69 may then be turned up so as to clear its stop 70, and then swung to the other side of the stop, in which position the vibrator continues running and air is admitted to the air tank for drawing the pattern. The result of this movement is to cause the pattern to be drawn in the manner described.

Figs. 10 to 13 show in each case the positions of the two sets of passages which are arranged in different planes in the plug 68, and also show the relative positions of the ports or passages in the casing. In Fig. 10 the parts are shown to be in the position which they occupy prior to the operation of drawing the pattern under the influence of the vibrator, and in that figure the supply 71 of compressed air is cut off from the passage 72 that leads to the vibrator, because of the position of the opening 73 and the supply of air 71 is also cut off from the passage 74 that leads to the tank 42 which supplies oil to the drawing cylinders 39, because of the position of the passages 75, 76 and 77. The tank 42 is in communication, by way of 74, 75 and 77, with the exhaust 78, so that there is no air pressure in the tank or reservoir 42, consequently the flask support is necessarily in its lowest position because its weight forces the oil out of the cylinders 39 into the reservoir 42. As the handle 69 is turned into collision with its stop 70, the parts assume the positions shown in Fig. 11. In that position the port 73 has connected the air supply 71 with the vibrator by way of 72, and the ports 75, 76 and 77 still prevent access of air to the drawing cylinder tank 42; consequently the vibrator is running. As the handle is lifted past the stop 70, the valve is turned into the position shown in Fig. 12. In this position the port 73 still admits air to the vibrator, and air is also admitted by way of 76—77 to the tank or reservoir 42, so that while the vibrator is still running the flask frame is lifted in the manner described. The continued turning of the handle 69 brings the parts into the position shown in Fig. 13, which corresponds with the end of the rise of the flask support. In that figure air is excluded from the vibrator by the position of the port 73, so that the latter stops, having completed its work, and air is still admitted by way of 76—77 to the tank 42 for finishing the rising motion of the flask support. Subsequently the valve is brought back to its original position, shown in Fig. 10, in which the vibrator is at rest and the tank is in communication with the exhaust 78, so that the pattern support returns to its lowest postion. a, is a side passage, which is useful as a connection for a hose, to which a blower valve *b* is attached, as is customary on such machines. The valve *b*, is a blow valve for cleaning patterns and blowing off sand whenever necessary.

In Figs. 17, 18 and 19 there is illustrated a modified form of bed plate for the machine. This bed plate consists of castings 79, 80 and 81, which may be of uniform various lengths of size for machines, and it also consists of channel irons 82 and 83, which are bolted or otherwise secured to these castings, so that the channel irons can be cut of lengths appropriate to different sizes of machines. The bed plate is moreover comparatively inexpensive and very efficient.

Briefly the mode of operation of the described machine may be stated as follows: Starting from a position of rest, the operator turns the handle 56 from nearly upright position into the position shown in Fig. 2, so that its sector 63 collides with the circular part of the arm 64. The result of this is that the swinging head 2 assumes its vertical position and brings the part 66 of the arm 65 into such position that the sector 63 can be turned down into the part 66 and the handle 56 further turned. The result of this is that the ramming head as a whole rises in the manner described, and if it carries sand the latter is rammed and serves as a buffer. However, if sand is absent, the part 67 turns the handle 56 back again and thus checks the ramming head. By the proper manipulation of the handle 56 the ramming head is returned to its lowest position. The handle 69 is then turned into collision with the stop 70 so that the vibrator is set in motion, and after it is in motion the handle 69 is lifted over its stop and still further shifted so as to draw the pattern in the manner described and stop the vibrator, and after that operation it is returned to its initial position. As described, the proper adjustment of the yoke proper is effected by means of the stops 10 in the teeth 5 and the clamp screw 11. The part 47 serves to prevent the flask support from rising too far, and the distance to which it may rise is adjusted by the parts 49 and 50, as has been described. The oil driven plungers are self-lubricating, and they insure proper alinement and operation of the various parts. The columns 53, since they spring or yield, are very durable, and are not displaced or thrown out of alinement in use.

It will be obvious to those skilled in the art to which the invention relates that modifications may be made in details without departing from the spirit thereof, hence I do not limit myself to the precise construction and arrangement of parts hereinabove set forth and illustrated in the accompanying drawings, but

Having thus described the nature and objects of the invention, what I claim as new and desire to secure by Letters Patent is—

1. The combination in a molding machine of a part to be vibrated, a support for the part to be vibrated, and flexible columns consisting of slender struts interposed between and rigidly connected with said part and support whereby the former is supported and positioned, substantially as described.

2. The combination in a molding machine of a ramming head, a part to be vibrated, flexible columns consisting of slender struts rigidly connected with the ramming head and with said part to support and position the latter, and abutments on the ramming head for receiving thrust, substantially as described.

3. The combination in a molding machine of a pattern plate, a ramming head, a vibrator for the pattern plate, and flexible columns consisting of slender struts rigidly connected with the pattern plate and ramming head, substantially as described.

4. In a molding machine the combination of a ramming head and flask support, cylinders attached to the ramming head, pistons attached to the flask support, skirts depending from the flask support around the open ends of the cylinders and constituting dust guards and means for introducing oil to the cylinders, said cylinders and pistons serving to both guide and lift the flask support, substantially as described.

5. In a molding machine the combination of a flask support and a pattern plate movable the one in respect to the other, means for moving the flask support, a rod connected with said support, a spring connected with the rod and adapted to abut upon the head, and means for shifting said spring to adjust the travel of the support, substantially as described.

6. A vibrator frame for molding apparatus having a plurality of yielding and resilient supports mounted thereon and projecting beyond the face thereof.

7. In a molding machine the combination of a flask support and a pattern plate movable the one in respect to the other, means for moving the flask support in respect to the plate, a rod connected with the flask support and provided with a series of circumferential grooves, a spring on said rod to act as a buffer, a split ring adapted to said circumferential grooves, and a continuous ring adapted to hold the parts of the split ring, substantially as described.

8. In a molding machine the combination of a swinging head, a spring tending to swing the same in one direction, a piston and a cylinder for swinging the head in the other direction, a fluid tank, connections between the tank and cylinder, and means for creating and relieving pressure in the tank, substantially as described.

9. In combination in a molding machine, a base, a swinging head provided with an arm, a cylinder carried by the base, a coupling connected with the arm, a spring interposed between the cylinder and coupling, and a plunger connected with the coupling, substantially as described.

10. In combination in a molding machine, a swinging head, a piston and a cylinder for actuating it, an inlet for the cylinder, and said piston having a double tapered groove and a fluid passage therefrom, whereby it is caused to start and stop slowly, substantially as described.

11. In combination in a molding machine, a ramming head, a piston and a cylinder for moving the same, an admission valve, and a projection on the ramming head adapted to operate the admission valve to stop the rise of the ramming head, substantially as described.

12. In a molding machine the combination of a ramming head and its complemental piston and cylinder, an admission valve provided with a handle, and a projection on the ramming head adapted to collide with the handle and operate the valve to prevent excess travel of the ramming head, substantially as described.

13. The combination in a molding machine of a swinging head and a ramming head and their complemental actuating mechanism, a valve for controlling the movements of the ramming head and the swinging head, and an arm on the ramming head for preventing the valve from being shifted to actuate the ramming head until after the swinging head is in proper position, substantially as described.

14. In a molding machine the combination of a swinging head and its oil reservoir and its piston and cylinder and their accessories, a ramming head and its piston and cylinder and their accessories, a valve having a connection for compressed air and a connection to the oil reservoir and a connection to the ramming cylinder and a connection to the exhaust, and a plug adapted to said valve and provided with two ports or passages, whereby the swinging head is made to operate before the ramming head, substantially as described.

15. The combination in a molding machine of a vibrator, a drawing cylinder and its complemental oil tank and connections, a valve having compressed air inlets arranged in two planes, and a connection to the vibrator in one of said planes and a connection to the reservoir and a connection to exhaust arranged in the other of said planes, and a plug for said valve having passages arranged to said planes, and means for temporarily locking said valve, substantially as described.

16. In combination in a molding machine, a vibrator, a drawing cylinder, a valve for starting these parts in the order named, and means for permitting said valve to be opened and obstructed to first start the vibrator and for permitting it to be further opened to start the drawing cylinder whereby proper operation of the vibrator is insured before the pattern is drawn, substantially as described.

17. In a molding machine the combination of a vibrator, a drawing cylinder, a valve for starting these parts in the order named, an operating handle movably connected with the valve, and a stop for permitting the handle to be turned and arrested to start the vibrator and said stop arranged so that thereafter the handle may be moved to clear it and further turned to start the drawing cylinder, substantially as described.

18. A molding machine consisting of the combination of a swinging head and means for shifting it, devices for automatically controlling said means to stop and start the swinging head slowly, a ramming head, means for actuating it, automatic devices for slowly stopping and starting the means which actuate the ramming head, a part to be moved to draw the pattern, means for moving said part, and devices for automatically slowly stopping and starting the means which actuate said parts, substantially as described.

19. A molding machine comprising the combination of a swinging head and devices for actuating it, a ramming head and devices for actuating it, a single valve for controlling the devices which actuate both of said heads, and means for retarding the motion of said valve to insure the operation of the swinging head prior to the actuation of the ramming head, a vibrator, a part to be moved to draw the pattern and means for moving said part, a single valve for controlling the vibrator and the devices which actuate said part, and means for interrupting the actuation of said valve to insure the operation of the vibrator prior to the operation of the part to be moved to draw the pattern, substantially as described.

20. A molding machine comprising the combination of a spring-controlled swinging head, an oil reservoir and its accessories for actuating the swinging head, a ramming head, a piston and cylinder for actuating it, a pneumatic vibrator, a part to be moved to draw the pattern, an oil reservoir and its accessories for actuating said part, pneumatic connections to the vibrator and to the ramming cylinder and to each of said reservoirs, two valves for said connections, and means for checking the movement of said valves, substantially as described.

21. In a machine of the character described, the combination with a ramming cylinder and lifting cylinders carried by the ramming cylinders, of independent air connections to said cylinders.

22. In a machine of the character described, the combination with a ramming cylinder, lifting cylinders carried by the ramming cylinder and air connections to said cylinders, of means for controlling independently the passage of air to the ramming cylinder and to the lifting cylinders.

23. In a machine of the character described, the combination with a ramming cylinder, lifting cylinders carried by the ramming cylinder and vibrating mechanism, of an air connection to the ramming cylinder, air connections to the vibrating mechanism and the lifting cylinders and vibrator and lifting valves in said connections.

24. In a machine of the character described, the combination with a ramming cylinder, lifting cylinders on opposite sides thereof and vibrating mechanism, of air connections to the cylinders and the vibrating mechanism, a valve for controlling the passage of air to the ramming cylinder, valves for controlling the passage of air to the vibrating mechanism and the lifting cylinders, and means for successively actuating the vibrator and the lifting valves.

In testimony whereof I have hereunto signed my name.

WILFRED LEWIS.

Witnesses:
W. J. JACKSON,
FRANK T. KALAS.